(No Model.) 2 Sheets—Sheet 1.
M. SCHNEIDER.
HARVESTER REEL.
No. 539,828. Patented May 28, 1895.
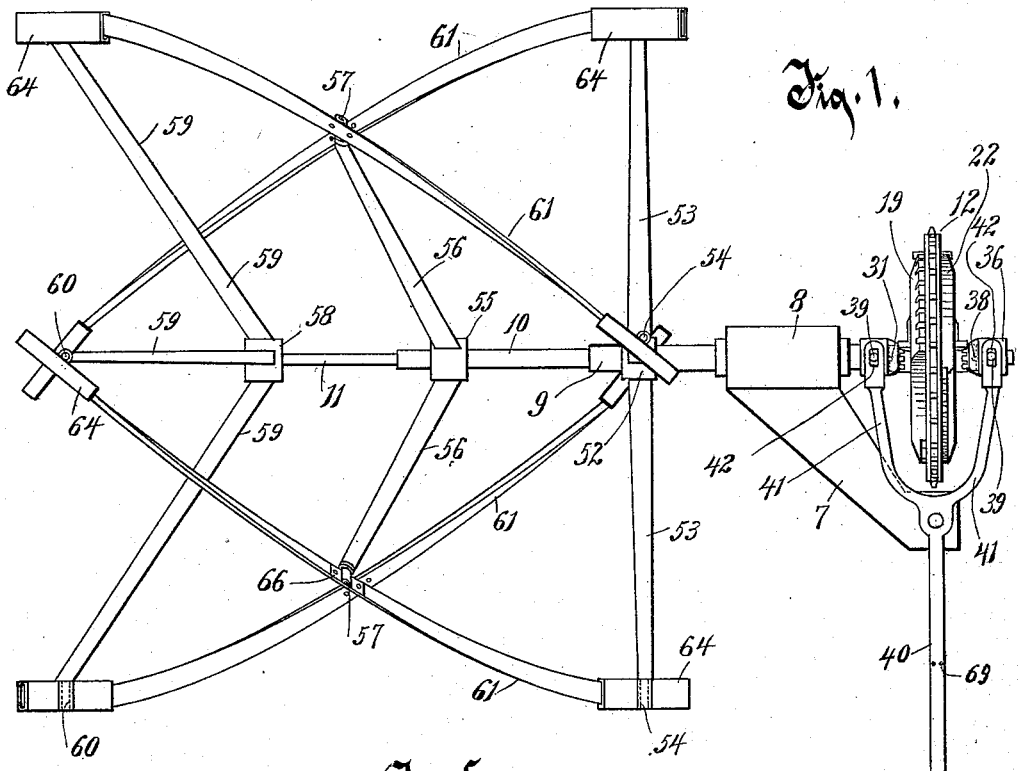
Witnesses.
O. N. Kinney
Anna V. Faust
Inventor.
Mathias Schneider,
By Benedict and Morsell
Attorneys.

(No Model.) 2 Sheets—Sheet 2.
M. SCHNEIDER.
HARVESTER REEL.
No. 539,828. Patented May 28, 1895.
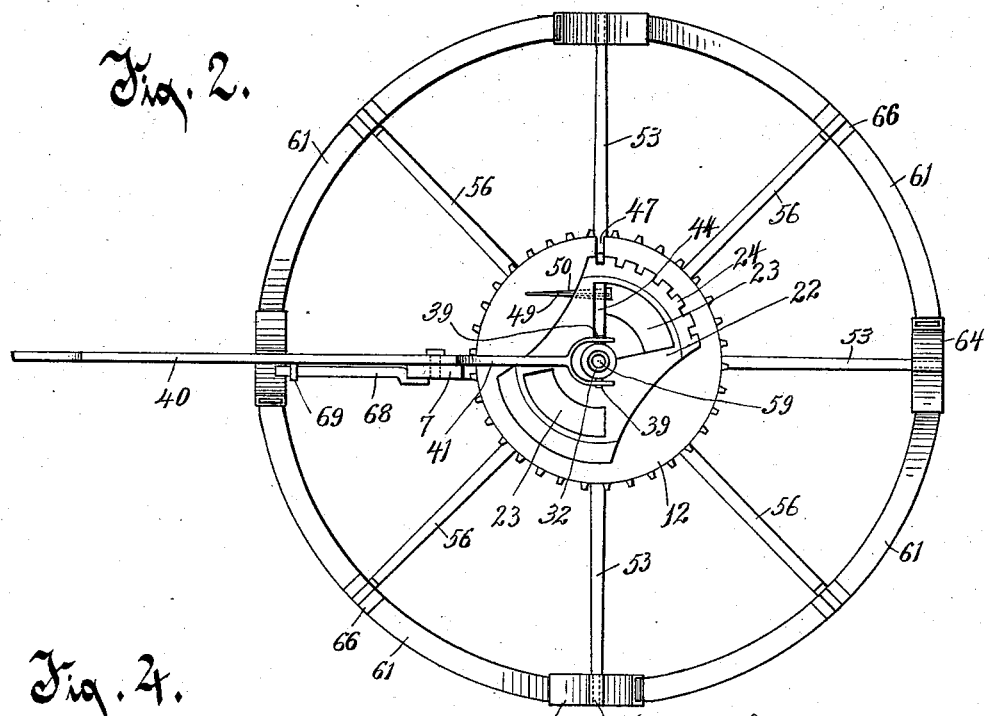
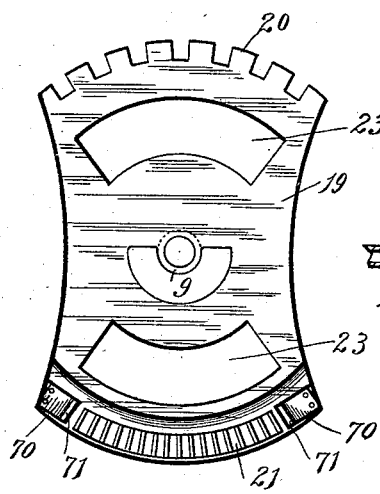
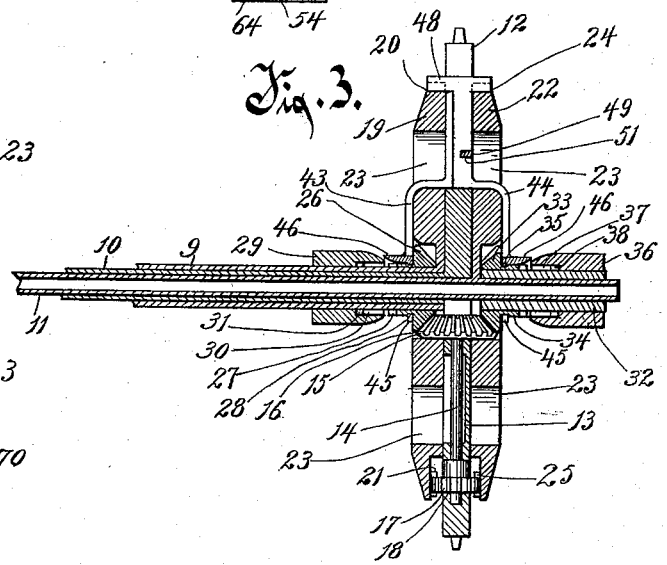
Witnesses.
Inventor
Mathias Schneider,
By Benedict and Morsell
Attorneys.

UNITED STATES PATENT OFFICE.

MATHIAS SCHNEIDER, OF CAMPBELLSPORT, WISCONSIN.

HARVESTER-REEL.

SPECIFICATION forming part of Letters Patent No. 539,828, dated May 28, 1895.

Application filed May 7, 1894. Serial No. 510,335. (No model.)

*To all whom it may concern:*

Be it known that I, MATHIAS SCHNEIDER, of Campbellsport, in the county of Fond du Lac and State of Wisconsin, have invented a new and useful Improvement in Harvester-Reels, of which the following is a description, reference being had to the accompanying drawings, which are a part of this specification.

My invention has relation to improvements in harvester reels. In the travel of machines of this character over the ground bent or deflected stalks are often encountered which it is impossible for the harvester reel to reach, or, if reached, they are carried rearward in their bent or oblique positions, and when severed by the knives are irregularly deposited on the machine, or deposited thereon at varying and differing angles. It is, therefore, the object of my invention to provide a construction which is not alone adaptable for conveying straight grain to the platform, but also for reaching bent or deflected stalks, and gathering them properly in to the cutter knives, and depositing them in a regular heap on to the platform to the rear of the cutting apparatus, transversely of said cutting apparatus, and this while the machine continues on its travel, and without necessity of stopping the rotation of the reel shafts. An incidental object is to provide, in a machine having the above characteristic, means whereby the grain is held close to the cutter bar, so as to insure the cutting of said grain.

With the above objects in view, the invention consists of the devices and parts, or their equivalents, as hereinafter more fully described and claimed.

In the accompanying drawings, Figure 1 is a plan view of the device. Fig. 2 is an end elevation. Fig. 3 is a vertical sectional view of a fragment of the machine. Fig. 4 is a side elevation of one of the segments. Fig. 5 is a side elevation of a fragment of one of the slats, showing the end sleeve in section; and Fig. 6 is a plan view of Fig. 5.

Like numerals of reference denote like parts throughout the several views.

Referring to the drawings, the numeral 7 indicates an arm, which is connected to the harvester frame, (not shown) said arm provided at its inner end with a bearing eye or sleeve 8. In this eye or sleeve is journaled a tubular shaft 9. Through this shaft passes another tubular shaft 10, and through shaft 10 in turn passes still another shaft 11.

Fixed upon the end of the middle shaft 10, or formed integral therewith, is a sprocket wheel 12, driven by a sprocket chain (not shown) running from the driving mechanism of the harvester proper. This sprocket wheel is provided on one face with a recess 13, in the ends of which recess is journaled a radial shaft 14, said shaft carrying at its inner end a beveled gear 15, which is arranged in a transverse opening 16 for its accommodation. The opposite end of the radial shaft is provided with a toothed wheel 17 arranged within a transverse opening 18 in the face of the sprocket wheel.

The outer shaft 9 is formed or provided at its end with a segment 19, which segment has one peripheral edge toothed, as indicated at 20, and near the opposite peripheral edge on one side is formed with a curved rack 21.

The long inner shaft 11 is formed or provided, at a distance from one of its ends, with a segment 22, similar in all respects to the segment 19. These segments 19 and 22, as will be clearly seen from the drawings, lie against opposite faces of the sprocket wheel 12. They are also, as will be seen, provided with curved slots 23, 23. Segment 22 is also provided with upper peripheral teeth 24, and with the lower outstanding teeth, which latter teeth form a rack bar 25. The toothed wheel 15 of the radial shaft 14 is arranged between the two rack bars 21 and 25 in such manner as to engage therewith.

Loose upon the shaft 9 is a beveled gear 26. Said gear is provided with a tubular toothed extension 27, and said tubular extension is also provided with an annular exterior recess 28. A collar 29 is also loose upon the shaft 9, said collar having its end adjacent to the gear wheel of conical form, and provided with an end annular recess 30, from the inner end of which recess projects outwardly one or more pins or lugs 31.

Upon the outer end of the inner shaft 11 is a sleeve 32, said sleeve being held rigid to the shaft by means of a key or pin. (Not shown.) Upon this sleeve is loosely mounted a beveled gear 33, similar in all respects to the gear 26, and provided with a tubular toothed extension 34, having a recess 35 therearound. A collar 36 is also loose on the sleeve 32, and this collar has its end adjacent to the beveled gear 33 of conical shape, and provided with an end annular recess 37, having one or more pins or lugs 38 projecting outward from the end of the recess. The collars 29 and 36 have extending from opposite points pins 39, 39.

An operating lever 40 is pivoted to the end of the arm 7, and this lever has its inner end forked to form two arms 41, 41, which arms have their ends bifurcated, said furcated parts being slotted, as indicated at 42, 42, which slots receive the pins 39 projecting from the collars 29 and 36.

Against the outer faces of the segments 19 and 22 are arranged arms 43 and 44, respectively. These arms have forked lower ends 45 which engage the exterior annular recesses 28 and 35 of the respective tubular extensions of the beveled gears 26 and 33. Projecting out laterally from the upper ends of the forks are partly curved lugs 46, 46, the ends of which are slightly beveled. The arms 43 and 44 are bent inwardly at angles into the upper slots 23 of the respective segments, said arms extending upwardly back of the segments, and fitting in a slot 47 in the wheel 12, said slot extending to the periphery of the wheel. That portion of the arm 44 which lies in the slot 47 is thicker than the adjacent arm 43 which is secured to it. Arm 44 is also extended up above the peripheral teeth 20 and 24 of the segments, said extended end being provided with a cross head 48, which fits in the spaces between the teeth 20 and 24. To normally keep this cross head in engagement with the teeth, I employ a flat spring 49, which is secured at one end in the narrow end of a tapering slot 50, the opposite end of said spring engaging a slot 51 in the arm 44, as shown clearly in Fig. 3.

Secured rigidly to the tubular shaft 9 is a hub 52 and radiating from this hub are a series of spokes 53, said spokes having pins 54 extending at oblique angles from their ends. The central shaft 10 is also provided with a rigid hub 55, from which radiate spokes 56, said spokes provided with the end angularly-extending pins 57. The inner shaft 11 is similarly provided with a fixed hub 58, having extending therefrom spokes 59, provided with end pins 60.

The numerals 61 indicate transverse reel bars which connect the ends of the several spokes. These bars are each constructed of a series of thin strips of wood 62, united together centrally by a clip, or equivalent 63. The strips also are preferably slitted inwardly from opposite ends, in order to increase the bending capacity of the bars. It is obvious that the bar need not necessarily be composed of separate strips of wood, inasmuch as simply a bar of wood of the proper width slitted longitudinally from opposite ends inwardly, without extending the slits throughout the entire length of the bar, would answer the purpose. Upon opposite ends of the reel bars are sliding sleeves 64, each of which sleeves is provided with a loop 65. These loops receive the end pins 54 and 60 of the spokes 53 and 59. To the center of each reel bar is fastened a plate 66, provided with a loop 67 to receive the pin 57 of a central spoke 56, forming a central pivotal or turning point.

Secured to the under side of the arm 7 is a spring bar 68, the free end of said spring bar fitting between two pins similar to 69, depending from the under side of the operating lever 40.

By reference to Fig. 4, which illustrates, for instance, the segment 19, it will be noticed that beyond opposite ends of the rack bar 21 are attached spring plates 70, 70, each plate having its free inner end provided with an inwardly extending tooth 71. Similar plates, it will be understood, are arranged beyond opposite ends of the rack bar 25 of the segment 22.

In operation, it will be understood that the three shafts 9, 10 and 11 are rotated together as the machine moves over the ground, by means of the sprocket wheel 12 which is operated by means of a sprocket chain (not shown) running from the driving mechanism of the machine. If, now, we suppose that the several spokes 53, 56 and 59 are parallel so that the connecting slats 61 are arranged in a straight line, and it is desired to adjust them so as to throw the same at incline, the operating lever 40 is turned upon its pivot, which will have the effect of throwing either collar 29 or 36 toward the sprocket wheel 12 in accordance with the direction in which the operating lever is swung. The clutch pin or pins of the collar so adjusted will then engage the teeth of the tubular extension of the beveled gear wheel adjacent, and thereby hold said beveled gear wheel locked thereto. The sprocket wheel 12 revolving in one direction will carry the beveled gear 15 in a circle around the gear which is held stationary by the clutch collar adjusted in the manner just described. The effect is to turn said beveled gear wheel 15 in one direction, and the outer toothed wheel 17 in the same direction. The teeth of wheel 17 acting on the rack bars 21 and 25 will cause the two segments 19 and 22 to rotate in opposite directions, and consequently cause the spokes 53 and 59 to be thrown at opposite inclines. The position of the central spokes 56, however, always remains fixed with respect to the axis of the sprocket wheel 12. If it is desired to reverse the opposite inclinations of the spokes 53 and 55, all that is necessary to be done is to turn the lever 40 upon its pivot in an opposite direction to its first movement, which will have the effect of throwing the other clutch collar into engagement with its bevel gear, for the purpose of holding said gear stationary, which, of course, will have the effect of causing an opposite rotation of the toothed wheel 17, and consequently changing the opposite paths of rotation of the segments. It will be noticed that as soon as a clutch collar is adjusted to engage with its bevel gear the conical end of said collar will ride under the lip 46 of the adjacent arm 44, and cause the uplifting of said arm, and consequently the disengagement of the cross head 48 from between the peripheral teeth, thus allowing for the movement of the segments. The moment the proper adjustment of the spokes is obtained, the lever 40 is released, and the spring plate 68, by reason of its position between the pins 69, will cause the automatic return of said lever to its normal position, and consequently the disengagement of the conical end of the clutch collar with the lip 46. As soon as this takes place, the spring 49 acting downward on the arm 44 will cause said arm to return to its normal position, and throw the cross head 48 into engagement with the peripheral teeth 20 of the segments, thereby holding said segments to their adjusted positions.

The spring plates 70, 70 provided with the inwardly extending teeth 71, 71 are employed for the purpose of insuring the engagement of the toothed wheel 17 with the rack bars after the segments have been rotated in opposite directions to their full extent. After the limit of travel of the segments has been reached, the toothed wheel 17, of course, continues to rotate, but in a direction to effect only a depression of the tooth 71. When one of the gears 26 and 33 is locked for the purpose of causing the reverse opposite movements of the segments, the toothed wheel first engages with the teeth 71, and is thereby carried to the first teeth of the rack bars.

It will of course be understood that the inclining of the spokes 53 and 59 in the manner above explained will have the effect of inclining the reel bars 61, as clearly shown in Fig. 1, said reel-bars turning on the central pivot pins 57. When the bars are thus inclined it is necessary that their lengths should be increased, so that they will correspond in length to the cutter, (not shown) which as is well understood, is located beneath the reel and thereby be enabled to bring the grain to the full length of said cutter. It is for this purpose that I provide the sleeves 64, which automatically slide outward as the inclinations of the reel bars are changed. It will be seen that no matter what may be the inclination of the bars, they are at all times of equal length with the length of the cutter, and consequently the grain is brought to the cutter along the full length of said cutter, so that the complete cutting capacity of the cutting edge is utilized. If this elongation of the bars were not provided for, it is obvious that with the inclining of said bars, they would be shortened relatively to the cutter, and consequently grain would not be carried to the cutting edge throughout its full length, thereby leaving a portion of said cutting edge inactive. With the adjustment of the inclinations of the bars, a certain twist is necessarily given to said bars, as shown fully in Fig. 1, and it is in order to provide for this twist or bend that the bars are made flexible, by means of constructing the same of a series of slitted strips.

In order to hold the grain close to the cutter bar, so as to insure the cutting of the grain, it is necessary that all parts of the reel bars in their rotation should always be at a constant distance from the reel shaft, or in other words, should be presented at an equal distance to the cutters, and in close proximity thereto. In order to attain this object, when the blades are adjusted at inclinations, it is necessary that the reel bars should assume curved or bowed forms. The bars, as above stated, being flexible, this is readily attainable inasmuch as when the spokes 53 and 59 are adjusted in the manner previously pointed out, this bowing necessarily takes place, being rendered possible by the flexible character of the reel bars, and their consequent capability of bowing or curving outward. This bowing or bending is greatly facilitated by the employment of the central spokes 56, which form fulcra or central resisting points for the bending. The central spokes 56 also possess another important function in preventing the reel-bars when bent, and when one set of spokes is turned half way around, from contacting with the shafts.

From the preceding description, it will be seen that the reel-bars are inclined or turned obliquely, and simultaneously twisted longitudinally, or given an auger shape or conveyer-screw form, and also bent edgewise. The inclining or oblique turning of the bars serves to carry bent or deflected stalks to the cutter in a straight line, the longitudinal twist to compel the face of each reel-bar to be presented to the grain, and the edgewise bend compelling all parts of each horizontal reel-bar to be presented at an equal distance to the cutter. Besides this, simultaneously with these different adjustments of the reel-bars, the sleeves 64 are automatically slid outwardly, whereby the reel-bars are made to adapt themselves to the full length of the cutter-bar, notwithstanding the fact of the adjustments just referred to, which were it not for these sleeves, would cause the reel-bars to fall far short of the length of the cutter-bar, with the result that the complete cutting edge of said cutter-bar would not be utilized.

Having thus described my invention, what I claim, and desire to secure by Letters Patent, is—

1. In a harvester reel, the combination, of a main rotatable shaft, sets of spokes radiating therefrom, transverse flexible reel bars connecting the spokes, means for throwing the respective sets of spokes out of parallelism, whereby the transverse bars are turned to positions oblique to the axis of rotation, and are given a longitudinal lateral twist, or formed with an auger shape or conveyer-screw form, the oblique position of the bars serving to carry bent or deflected stalks to the cutter in a straight line, and the longitudinal lateral twist compelling the face of each bar to be presented to the grain, and mechanism engaging the bars at points between the sets of spokes, said mechanism adapted, when the spokes are thrown out of parallelism, to cause the bars to be given an edgewise bend, said edgewise bend compelling all parts of each bar to be presented at an equal distance from the cutter, substantially as set forth.

2. In a harvester reel, the combination, of a main rotatable shaft, sets of spokes radiating therefrom, transverse flexible reel bars connecting the spokes, said bars consisting each of a strip, or a plurality of strips, of wood slitted longitudinally, and means for throwing the respective sets of spokes out of parallelism, substantially as set forth.

3. In a harvester reel, the combination, of a main rotatable shaft, sets of spokes radiating therefrom, transverse flexible reel bars connecting the spokes, said bars each consisting of a section held against longitudinal movement and a section or sections sliding thereon, and connected with the spokes, and means for throwing the respective sets of spokes out of parallelism, whereby the sliding sections of the reel bar are automatically actuated, to cause said sections to be slid inwardly or outwardly, for the purpose of lengthening or shortening the bars, substantially as set forth.

4. In a harvester reel, the combination, of a plurality of telescoping shafts, adapted to be rotated synchronously, said several shafts having spokes radiating therefrom, the spokes of the central shaft remaining fixed relative to the axis of rotation, transverse reel bars connecting the several spokes, and means for rotating the shafts other than the central shaft in opposite directions independent of the rotation of all of the shafts together, whereby the spokes carried by the shafts so rotated independently are adjusted at opposite inclinations, substantially as set forth.

5. In a harvester reel, the combination, of a plurality of telescoping shafts, having spokes radiating, respectively, therefrom, transverse flexible reel bars connecting said spokes, a sprocket wheel fast to the central shaft, segments on opposite sides of the sprocket wheel, and fast to the other shafts, said segments provided with opposite rack bars or teeth, a radial shaft provided at its outer end with a toothed wheel meshing with the opposite rack bars of the segments, and means for rotating the radial shaft in opposite directions to impart reverse rotation to the toothed wheel carried thereby, whereby the segments are made to rotate reversely in opposite directions, substantially as set forth.

6. In a harvester reel, the combination, of a plurality of telescoping shafts having spokes radiating, respectively, therefrom, transverse flexible reel bars connecting said spokes, a sprocket wheel fast to the central shaft, segments on opposite sides of the sprocket wheel, and fast to the other shafts, said segments provided with opposite rack bars or teeth, a radial shaft within a recess of the sprocket wheel, said shaft carrying at its inner end a beveled gear, and at its outer end a toothed wheel meshing with the opposite rack bars of the segments, beveled gears loose upon the shafts other than the shaft carrying the sprocket wheel, and clutches also loose on said shafts, said clutches adapted to be thrown alternately into engagement with said gear wheels to hold the same stationary, substantially as set forth.

7. In a harvester reel, the combination, of a plurality of telescoping shafts having spokes radiating, respectively, therefrom, transverse flexible reel bars connecting said spokes, a sprocket wheel fast to the central shaft, segments on opposite sides of the sprocket wheel and fast to the other shafts, said segments provided with opposite rack bars or teeth, a radial shaft within a recess of the sprocket wheel, said shaft carrying at its inner end a beveled gear, and at its outer end a toothed wheel meshing with the opposite rack bars of the segments, beveled gears loose upon the shafts other than the shaft carrying the sprocket wheel, clutches also loose on said shafts, and a pivoted lever having a forked inner end, the arms of said forked end engaging the clutches, substantially as set forth.

8. In a harvester reel, the combination, of a plurality of telescoping shafts having spokes radiating, respectively, therefrom, transverse flexible reel bars connecting said spokes, a sprocket wheel fast to the central shaft, segments on opposite sides of the sprocket wheel and fast to the other shafts, said segments provided with opposite rack bars or teeth, and each having a peripheral edge provided with teeth, a radial shaft within a recess of the sprocket wheel, said shaft carrying at its inner end a beveled gear, and at its outer end a toothed wheel meshing with the opposite rack bars of the segments, beveled gears loose upon the shafts other than the shaft carrying the sprocket wheel, an arm or arms having an upper cross head adapted to normally engage the peripheral teeth of the segments, said arm or arms passing on opposite sides of the segments and provided with projecting lips, and clutches loose on the shafts other than the shaft carrying the sprocket wheel, said clutches adapted to be thrown alternately into engagement with the gear wheels carried by the same shafts, and when so actuated to cause the uplifting of the arm or arms, and the disengagement of the cross head with the peripheral teeth, substantially as set forth.

9. In a harvester reel, the combination, of a plurality of telescoping shafts having spokes radiating, respectively, therefrom, transverse flexible reel bars connecting said spokes, a sprocket wheel fast to the central shaft, segments on opposite sides of the sprocket wheel and fast to the other shafts, said segments provided with opposite rack bars or teeth, and each having a peripheral edge provided with teeth, a radial shaft within a recess of the sprocket wheel, said shaft carrying at its inner end a beveled gear, and at its outer end a toothed wheel meshing with the opposite rack bars of the segments, beveled gears loose upon the shafts other than the shaft carrying the sprocket wheel, an arm or arms having an upper cross head adapted normally to engage the peripheral teeth of the segments, said arm or arms passing on opposite sides of the segments and provided with projecting lips, clutches loose on the shafts other than the shaft carrying the sprocket wheel, a pivoted lever adapted to throw the clutches alternately into engagement with the gear wheels carried by the same shafts, said clutches when so actuated adapted to cause the uplifting of the arm or arms and the disengagement of the cross head from the peripheral teeth, and a spring for automatically returning the lever to its normal position, when pressure on the lever is removed, substantially as set forth.

10. In a harvester reel, the combination, of a plurality of telescoping shafts having spokes radiating, respectively, therefrom, transverse flexible reel bars connecting said spokes, a sprocket wheel fast to the central shaft, segments on opposite sides of the sprocket wheel and fast to the other shafts, said segments provided with opposite rack bars or teeth, spring plates at opposite ends of said rack bars or teeth, said plates having their free ends provided with upwardly-extending lugs, a radial shaft provided at its outer end with a toothed wheel meshing with the opposite rack bars of the segments, and means for rotating the vertical shaft to impart reverse rotations to the toothed wheel carried thereby, whereby the segments are made to rotate in opposite directions, substantially as set forth.

In testimony whereof I affix my signature in presence of two witnesses.

MATHIAS SCHNEIDER.

Witnesses:
C. C. HANSON,
JACOB SCHLAEFER.